No. 754,545. PATENTED MAR. 15, 1904.
C. E. DAVIS.
TRUCK.
APPLICATION FILED NOV. 21, 1903.
NO MODEL.
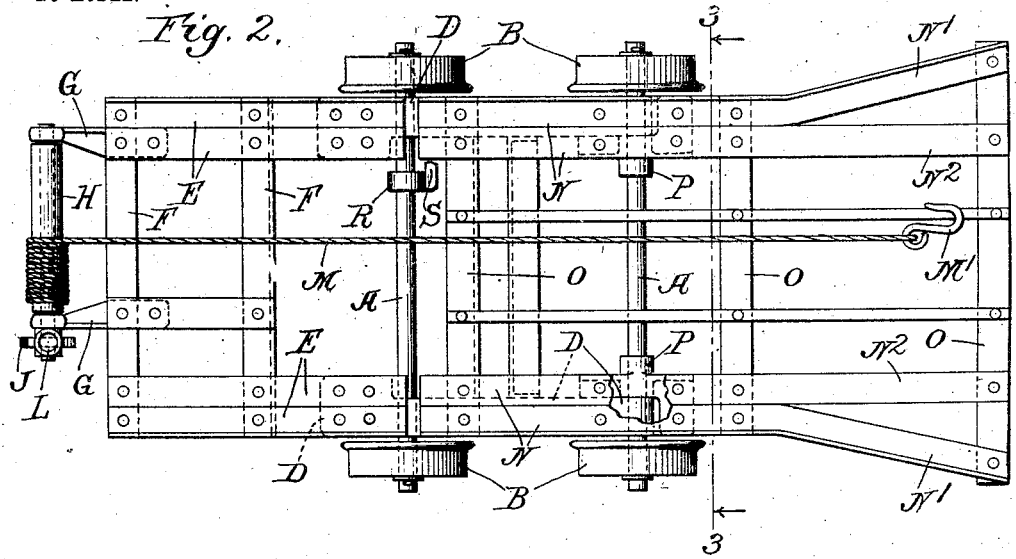
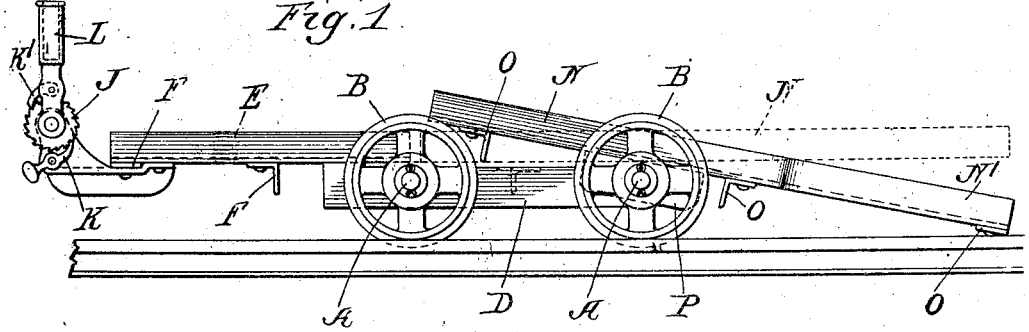
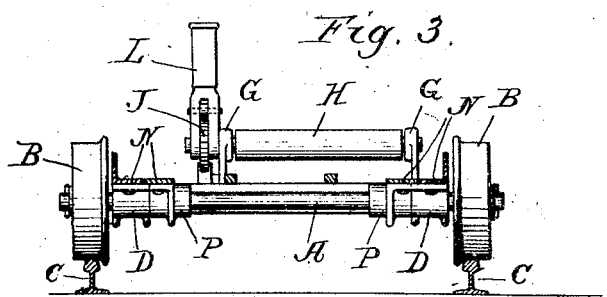
Witnesses:
Edward T. Wray
Howard L. Croft
Inventor:
Charles E. Davis
by Parker Carter
Attorneys No. 754,545.

Patented March 15, 1904.

UNITED STATES PATENT OFFICE.

CHARLES E. DAVIS, OF CHICAGO, ILLINOIS, ASSIGNOR TO GOODMAN MANUFACTURING COMPANY, OF CHICAGO, ILLINOIS, A CORPORATION OF ILLINOIS.

TRUCK.

SPECIFICATION forming part of Letters Patent No. 754,545, dated March 15, 1904.

Application filed November 21, 1903. Serial No. 182,048. (No model.)

*To all whom it may concern:*

Be it known that I, CHARLES E. DAVIS, a citizen of the United States, residing at Chicago, in the county of Cook and State of Illinois, have invented a certain new and useful Improvement in Trucks, of which the following is a specification.

My invention relates to trucks, and the particular form in which I have illustrated the same is a form peculiarly adapted for the purpose of handling mining-machines. In such cases the mining-machine, which has considerable weight, is lying upon the ground on or near the track upon which the truck runs. The truck to travel properly should in such cases have four wheels. It is commonly equipped with a device for drawing the mining-machine along the body of the truck until it is properly located over the wheels. To lock the mining-machine on the truck, it is the common practice to push the truck forward until its projecting forward end is near the mining-machine. The truck is then lifted at the rear end, swinging on its forward axle until the forward end of the truck has reached the ground in close proximity to the mining-machine. By now operating the windlass on the rear end of the truck the chain, which has been previously hooked into the mining-machine, is wound on the windlass, the mining-machine is drawn up on the truck, and when it has reached the proper position, so that the center of gravity is slightly rearward of the forward truck, the rear wheels of the truck fall down into their normal position. If the device is skilfully operated, these wheels will fall upon the track; if not, there will be some difficulty in swinging and lifting the truck until its four wheels are properly on the track. Moreover, it requires great effort sometimes to raise the rear end of the truck and bring it in such proper position. If the roof of the mine is low, the rear end of the truck is likely to come up near the roof, thus interfering with the operation of the windlass and otherwise hindering and making difficult the task of handling the truck. Moreover, if the roof is low, the effort imposed on the miners to lift the rear end of the truck is greater than under other conditions. Because of these other difficulties I have been led to make the invention hereinafter described. The particular form shown is illustrated in the accompanying drawings, wherein—

Figure 1 is a side view of the truck with parts shown in a second position by dotted lines. Fig. 2 is a plan view, and Fig. 3 is a section on the line 3 3 of Fig. 2.

Like parts are indicated by the same letters in all the figures.

A A are the axles, B B the wheels, and C C the rails on which the wheels run. The two axles are joined together by a framework consisting of the bars D D, and the rear stationary portion of the truck is composed of the wide side bars E E and cross-pieces F F. Reawardly projecting from this stationary part are the arms G G, in which is journaled the windlass H, having on one end the ratchet-wheel J, associated with the weighted dog K, which keeps the windlass from reverse rotation. Loosely journaled on one end of the windlass is the arm L, which carries the dog K'. When the arm is operated, the dog K' is moved so as to engage the ratchet-wheel and rotate the windlass. When the motion of the arm is reversed, the dog K' slides over the teeth of the ratchet-wheel.

M is a cable secured to and adapted to be wound on the windlass and provided with a hook M', by which it can be made fast to the mining-machine or other object to be loaded.

N N are the wide side bars of the movable portion of the frame. The forward portion of these side bars N' N' are bent out laterally, while the inner portions N² N² proceed in a right line.

O O are cross bars or pieces whereby the forward portion of the truck-body is made into a complete structure. This forward portion is pivoted on the axle at P P.

R is a sliding collar on the rear axle, provided with the finger S, which is adapted to overlie the end of the side bar N, and thus lock it in a fixer relation to the frame and forward portion of the truck-body when that is necessary. This would be necessary when the truck is to be moved on the track without being loaded. When the truck is loaded, no such lock is needed, for the load bridges the break between the two parts of the truck-body and holds these parts in position.

It will be understood that I have shown and described simply one form of my invention and in doing so have set out certain parts and relations thereof; but I wish it to be understood that I do not thereby desire to limit myself to these particular forms or to this particular embodiment of my invention. It must be obvious that the same can be realized in a variety of structures and that these structures must greatly differ in view of the particular uses to which the invention is to be applied. The form which I have shown I consider highly satisfactory for use where the truck is intended to run on rails and where the work to be done is the loading of heavy machinery, such as mining-machines, where they lie low down or upon the ground.

The use and operation of my invention are perhaps sufficiently indicated already. I will add, however, that the truck when the forward portion is locked in position can be freely moved out and inward on the track. When the machine is to be loaded, the truck is moved forward close to the machine, the lock is released, the forward end drops down and is pushed under the end of the mining-machine, the hook is made fast to the mining-machine, and the windlass is operated. The result, of course, is that the mining-machine is drawn up the inclined plane formed by the forward part of the truck-body when in this position, and this action continues until the center of gravity is a little to the rear of the forward axle, whereupon the forward part of the truck-frame gently swings into a horizontal position and the continued action of the windlass draws the machine along upon and above the rear part of the truck-body until the machine is properly loaded on the truck. Of course the forward portion of the truck could be formed so as to be nicely balanced on the axle or even so that its center of gravity would be in the rear of the forward axle; but I think what I have here shown is the preferred form.

I claim—

1. In a truck the combination of a supporting part with a normally fixed portion of the truck-body, and a tilting portion of the truck-body, both mounted on such support.

2. In a truck the combination of a wheeled support with a body mounted thereon, said body consisting of two parts, one in substantially rigid relation to said support, the other adapted to be tilted thereon.

3. In a truck the combination of a support with a substantially rigid and substantially horizontally-disposed body portion thereon, and a movable body portion mounted on the support and adapted to be tilted thereon, so as to bring its outer end to the ground.

4. In a truck the combination of a supporting part with a normally fixed portion of the truck-body, and a tilting portion of the truck-body, both mounted on such support, and a device on the fixed portion of the truck-frame adapted to draw the load over the movable portion.

5. In a truck the combination of a wheeled support with a body mounted thereon, said body consisting of two parts, one in substantially rigid relation to said support, the other adapted to be tilted thereon, and a device on the fixed portion of the truck-frame adapted to draw the load over the movable portion.

6. In a truck the combination of a support with a substantially rigid and substantially horizontally-disposed body portion thereon, and a movable body portion mounted on the support and adapted to be tilted thereon, so as to bring its outer end to the ground, and a device on the fixed portion of the truck-frame adapted to draw the load over the movable portion.

7. In a truck the combination of a support with a rigidly-fixed body portion thereon, a tilting body portion thereon, a windlass on the fixed portion, and a cable extending therefrom across the movable portion.

8. A truck comprising a wheeled support with a fixed body portion supported thereon and projecting therefrom in one direction, and a body portion supported thereon and projecting therefrom in the other direction and adapted to tilt thereon.

9. A truck comprising a wheeled support with a fixed body portion supported thereon and projecting therefrom in one direction, and a body portion supported thereon and projecting therefrom in the other direction and adapted to tilt thereon, said tilting portion pivotally connected with one axle of the supporting part.

10. A truck comprising a wheeled support with a fixed body portion supported thereon and projecting therefrom in one direction, and a body portion supported thereon and projecting therefrom in the other direction and adapted to tilt thereon, and a device on the fixed portion to draw the load up over the tilting portion.

11. A truck comprising a wheeled support with a fixed body portion supported thereon and projecting therefrom in one direction, and a body portion supported thereon and projecting therefrom in the other direction and adapted to tilt thereon, said tilting portion pivotally connected with one axle of the supporting part, and a device on the fixed portion to draw the load up over the tilting portion.

12. A truck comprising a wheeled support with a fixed body portion supported thereon and projecting therefrom in one direction, and a body portion supported thereon and projecting therefrom in the other direction and adapted to tilt thereon, and a device on the fixed portion to draw the load up over the tilting portion, said device consisting of a windlass-like part and a drawing-cable.

13. A truck comprising a wheeled support with a fixed body portion supported thereon and projecting therefrom in one direction, and a body portion supported thereon and projecting therefrom in the other direction and adapted to tilt thereon, said tilting portion pivotally connected with one axle of the supporting part, and a device on the fixed portion to draw the load up over the tilting portion, said device consisting of a windlass-like part and a drawing-cable.

CHARLES E. DAVIS.

Witnesses:
HOMER L. KRAFT,
HERBERT L. WEIDENBAUM.